(12) United States Patent
Bryant (10) Patent No.: US 11,303,999 B2
(45) Date of Patent: Apr. 12, 2022

(54) AGILE MICROPHONE TRANSMITTER SYSTEM

(71) Applicant: SAMSON TECHNOLOGIES CORP., Hicksville, NY (US)

(72) Inventor: Douglas Bryant, Centerport, NY (US)

(73) Assignee: SAMSON TECHNOLOGIES CORP., Hicksville, NY (US)

( * ) Notice: Subject to any disclaimer, the term of this patent is extended or adjusted under 35 U.S.C. 154(b) by 62 days.

(21) Appl. No.: 16/756,861

(22) PCT Filed: Dec. 20, 2018

(86) PCT No.: PCT/US2018/066798
§ 371 (c)(1),
(2) Date: Apr. 17, 2020

(87) PCT Pub. No.: WO2019/126500
PCT Pub. Date: Jun. 27, 2019

(65) Prior Publication Data
US 2021/0195321 A1    Jun. 24, 2021

Related U.S. Application Data

(60) Provisional application No. 62/608,925, filed on Dec. 21, 2017.

(51) Int. Cl.
*H04B 1/3827* (2015.01)
*H04R 3/00* (2006.01)
(Continued)

(52) U.S. Cl.
CPC .............. *H04R 3/00* (2013.01); *G06F 3/165* (2013.01); *H04B 1/3827* (2013.01); *H04R 1/08* (2013.01); *H04R 2420/07* (2013.01)

(58) Field of Classification Search
CPC .... H04B 1/3827; H04R 2420/07; H04R 3/00; H04R 1/08; G06F 3/165
See application file for complete search history.

(56) References Cited

U.S. PATENT DOCUMENTS

| 4,100,653 A | 7/1978 | Sensabaugh |
| 6,101,689 A * | 8/2000 | Jo ............................ A45F 5/02 24/332 |

(Continued)

FOREIGN PATENT DOCUMENTS

KR    10-0875721 B1    12/2008

OTHER PUBLICATIONS

International Search Report and Written Opinion dated Apr. 23, 2019, from International Application No. PCT/US2018/066798, 8 sheets.

(Continued)

*Primary Examiner* — Joseph Saunders, Jr.
(74) *Attorney, Agent, or Firm* — Katten Muchin Rosenman LLP (57) ABSTRACT

Disclosed herein is a wireless transmitter system which provides a small, frequency agile wireless microphone transmitter allowing active performers to have a wireless transmitter system without the inconvenience of a large transmitter. The wireless receiver of the wireless transmitter system comprises a large backlit display, simple operation with auto-scan channel selection, and infrared set for syncing the wireless microphone transceiver and wireless receiver. The wireless transmitter system is simple and easy to set up and operate. The wireless transmitter system further ensures clear, interruption-free performance by utilizing a True RF Diversity design with a pilot tone-key and auto-mute function. This provides maximum operating distance along with eliminating any background noise when the wireless microphone transceiver is out of range or powered off.

13 Claims, 13 Drawing Sheets

(51) Int. Cl.
*G06F 3/16* (2006.01)
*H04R 1/08* (2006.01)

(56) References Cited

U.S. PATENT DOCUMENTS

| | | | | |
|---|---|---|---|---|
| 6,892,426 | B2 * | 5/2005 | Schmidt | A45F 5/02 24/3.11 |
| 7,049,502 | B2 * | 5/2006 | Taku | G10G 7/02 84/454 |
| 7,138,177 | B2 * | 11/2006 | Pitzen | A47G 1/175 428/343 |
| D550,616 | S | 9/2007 | Dayan | |
| D619,118 | S | 7/2010 | Joseph | |
| D635,264 | S | 3/2011 | Dubs | |
| 8,013,572 | B2 * | 9/2011 | Rodgers | H02J 7/0044 320/114 |
| D646,280 | S * | 10/2011 | Yano | D14/412 |
| D656,924 | S * | 4/2012 | Mehlsen | D14/226 |
| D661,342 | S * | 6/2012 | Ridinger | D17/99 |
| D667,382 | S | 9/2012 | Cosentino | |
| D681,610 | S | 5/2013 | Twina | |
| D688,301 | S | 8/2013 | Ando | |
| 8,614,386 | B2 * | 12/2013 | Criscuolo | G10D 9/00 84/453 |
| D709,124 | S * | 7/2014 | Ridinger | D17/99 |
| D719,553 | S | 12/2014 | Noto | |
| D747,695 | S | 1/2016 | Breines | |
| 9,407,980 | B1 | 8/2016 | Cheng | |
| D809,462 | S | 2/2018 | Mizrahi | |
| D863,417 | S * | 10/2019 | Jia | D17/20 |
| 2006/0148405 | A1 * | 7/2006 | Wu | H04W 88/04 455/41.2 |
| 2008/0305840 | A1 | 12/2008 | Lin | |
| 2012/0318063 | A1 * | 12/2012 | Raguenet | G01H 1/12 73/584 |

OTHER PUBLICATIONS

Declaration of Douglas P. Bryant Under 37 CFR 1.130(b) and attachment, signed Jul. 25, 2019, 4 sheets.
AWX Wind instrument—Micro Transmitter UHF, wireless system, SAMSON, Dec. 3, 2017, (https://web.archive.org/web/20171203122414/http://www.samsontech.com/samson/products/wireless-systems/airline-atx/airline-awx/). See pp. 3-8; and figures 1-7.
Final Rejection dated Jun. 27, 2019, from U.S. Appl. No. 29/636,237, 7 sheets.
Non-Final Rejection dated Dec. 31, 2018, from U.S. Appl. No. 29/636,237, 17 sheets.
Samson SWSATXHM60, posted © 2018 [online], retrieved Dec. 17, 2018, retrieved from internet, <https://www.fullcompass.com/prod/551877-samson-swsatxhm60-airline-awx-wind-wireless-mic-system>.
Samson Airline AWX Wind Instrument Wireless System, posted Oct. 22, 2017 [online], retrieved Dec. 17, 2018, retrieved from internet, <https://www/americanmusical.com/ltem-i-SAM-SWSATXHM60-LIST>.
Samson AirLine AWX Wing Instrument Wireless Hom Microphone+Headphones+Throne, posted Jan. 10, 2018 [online], retrieved Dec. 17, 2018, retrieved from internet, <https://www.amazon.com/AirLine-Instrument-Wireless-Microphone-Headphones/dp/B078XS4YHS>.

* cited by examiner

AGILE MICROPHONE TRANSMITTER SYSTEM

CROSS-REFERENCE TO RELATED APPLICATIONS

This application claims priority to U.S. Provisional Application Ser. No. 62/608,925, filed Dec. 21, 2017, the entire contents of which are hereby incorporated by reference in their entirety.

FIELD OF THE INVENTION

The present invention relates to a wireless microphone transceiver and wireless receiver system. More particularly, the present invention relates to clip-on wireless microphone transceiver capable of agile transmission to a wireless receiver.

BACKGROUND

Wireless microphone systems that include a wireless microphone transceiver and wireless receiver offer suffer from limited range or other interference issues. Further, wireless microphone transceivers are either bulky and/or suffer from short battery life. Accordingly, there exists a need for a wireless microphone transceiver having a reduced form factor as well as an increased battery life that can reliably transmit either indoors or outdoors. The transmitting should be agile so that the system does not suffer interferences issues.

SUMMARY

The disclosed wireless transmitter system provides a small, frequency agile wireless microphone transmitter. This allows active performers to have a wireless transmitter system without the inconvenience of a large transmitter.

The wireless receiver comprises a large backlit display, simple operation with auto-scan channel selection, and infrared set for syncing the wireless microphone transceiver and wireless receiver. The wireless transmitter system is simple and easy to set up and operate. The wireless transmitter system further ensures clear, interruption-free performance by utilizing a True RF Diversity design with a pilot tone-key and auto-mute function. This provides maximum operating distance along with eliminating any background noise when the wireless microphone transceiver is out of range or powered off.

BRIEF DESCRIPTION OF THE DRAWINGS

The details of the invention may be appreciated in accordance with one or more embodiments of the present invention illustrated in the following drawings.

DETAILED DESCRIPTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
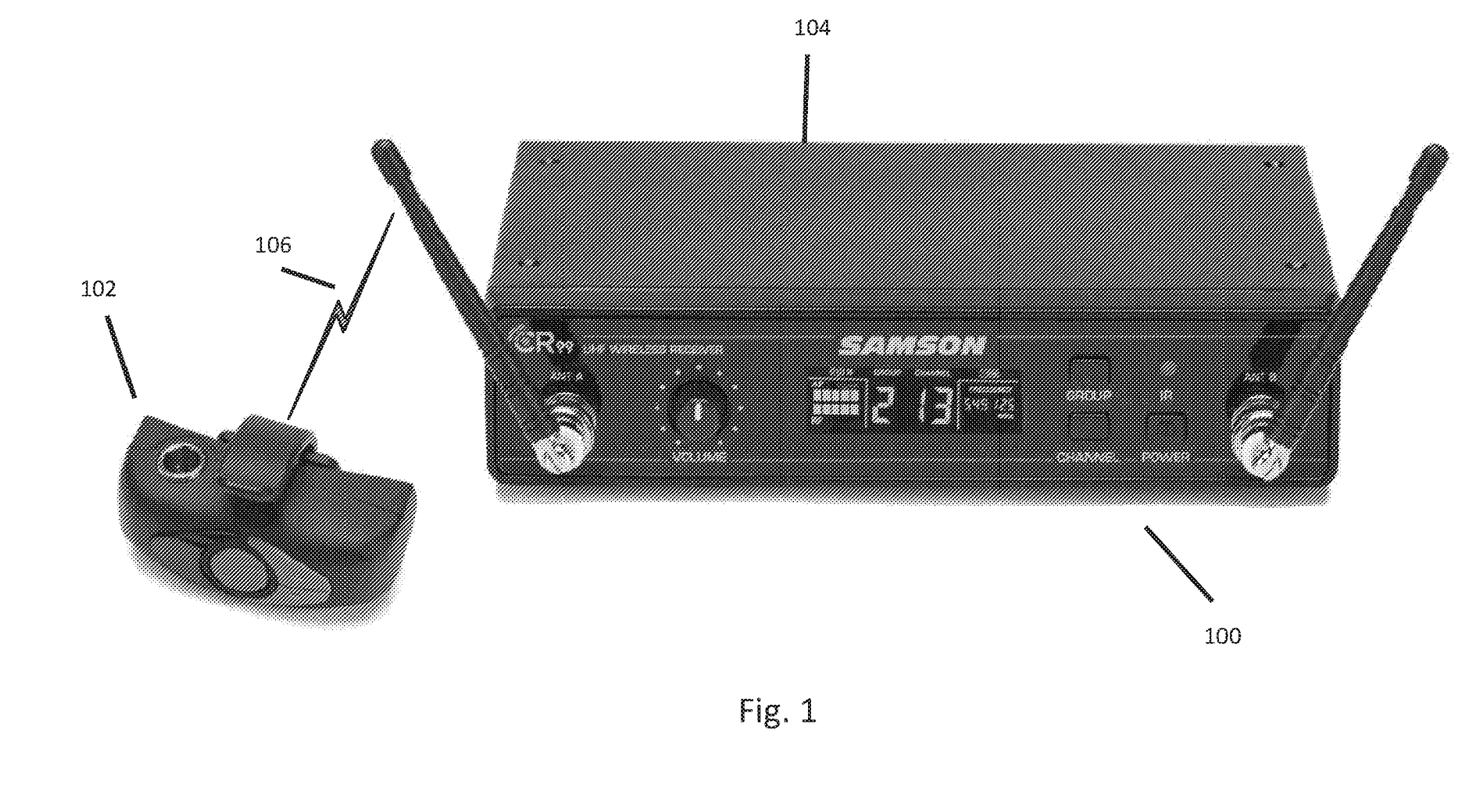
FIG. 1 depicts a schematic of the wireless microphone transceiver and wireless receiver in accordance with the present invention.

Referring first to FIG. 1, depicted is a schematic the primary components of the wireless transmitter system 100 comprising wireless microphone transceiver 102 and wireless receiver 104 which are both in communication over wireless connection 106. Preferably, the wireless connection operates on the UHF, VHF, 2.4 GHz band, 5.8 GHz band, or any combination thereof. The wireless receiver 104 is able to simultaneously communicate with a plurality of wireless microphone transceivers 102 (each operating on a different band or channel).

The wireless transmitter system 100 preferably has a working range of around 100 m (line of sight); an audio frequency response of 50 Hz-15 kHz; a total harmonic distortion (THD) (Overall)<1% (@AF 1 kHz, RF 46 dBu); a dynamic range>100 dB A-weighted; a Signal to Noise Ratio (SNR)>95 dB; an operating temperature of −10° C. (14° F.) to +60° C. (+140° F.); and a tone key frequency of 32.768 kHz.

Wireless Receiver 104

Figure 2:
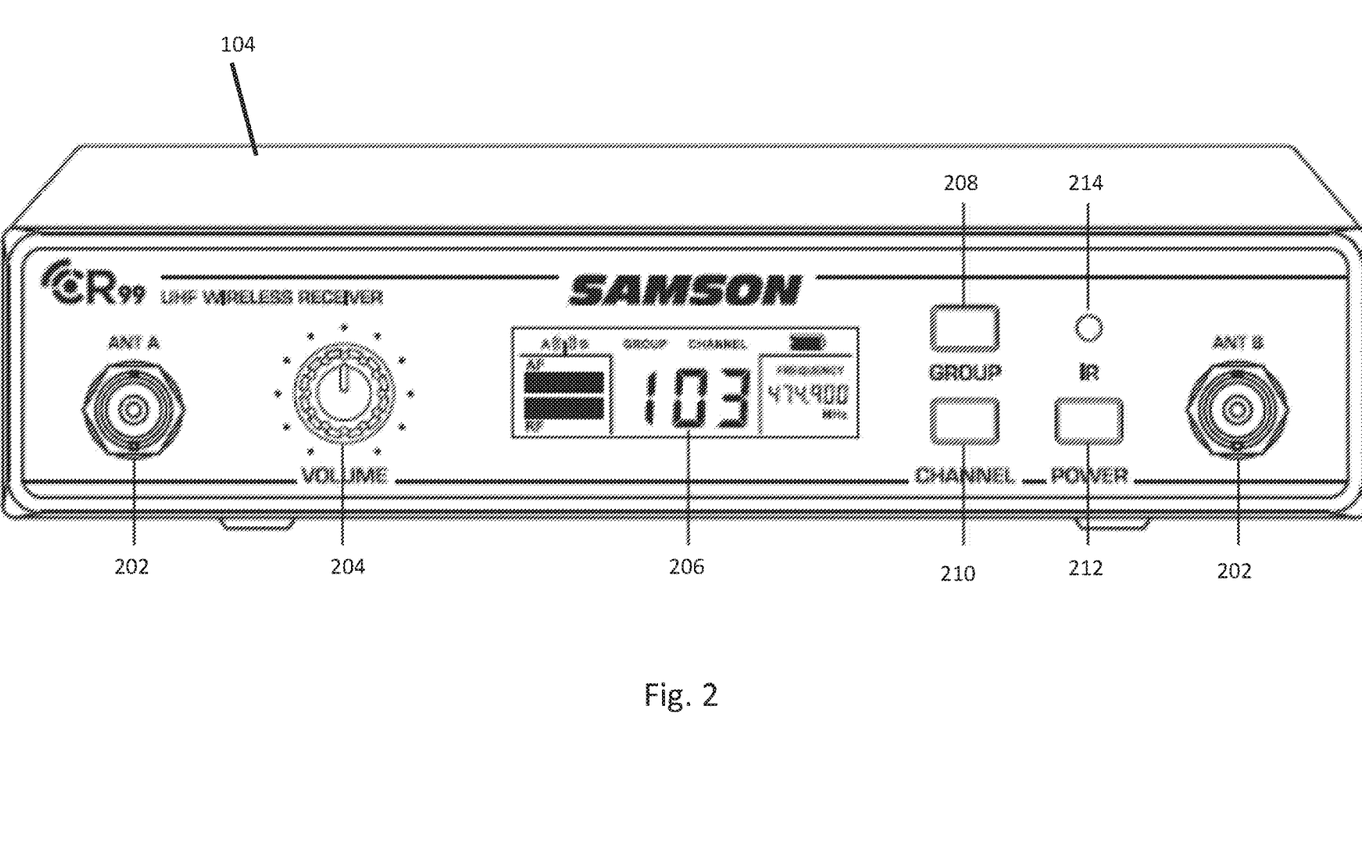
FIG. 2 depicts a schematic showing features of a front of the wireless receiver.

Details of the front/face of wireless receiver 104 are depicted in FIG. 2. As shown, the face of wireless receiver 104 generally comprises antenna jacks 202, volume control 204, display 206, group button 208, channel button 210, power button 212, and infrared (IR) transmitter 214. Antenna jacks 202 allow for any industry standard antenna to be attached to wireless receiver 104 using a Bayonet Neill-Conceman (BNC) connector. In a standard configuration, the antennas may be placed in a vertical position. However, it should be obvious that the position of the antennas may need to be modified based upon considerations such as venue layout, microphone location, etc.

Volume control 204 (e.g., in the form of a knob), allows the level of the audio signal to be set through both the balanced and unbalanced output jacks on the rear of the wireless receiver 104. The reference level for wireless receiver 104 is preferably obtained when volume control 204 is set to its highest level (e.g., knob is turned to 10). Display 206 preferably shows various transmitter and receiver settings for wireless receiver 104.

Group button 208 allows the user to cycle through available groups for the receiver. If the user presses and holds group button 208, the user can scan for available channels within the selected group.

Channel button 210 can be pressed and released to cycle through available channels within a group. Pressing and holding channel button 210 enters IR Set which is used to set the operating channel of the wireless microphone transceiver 102 as will be described later using IR transmitter 214. Power button 212 is used to turn wireless receiver 104 on and off.

Figure 3:
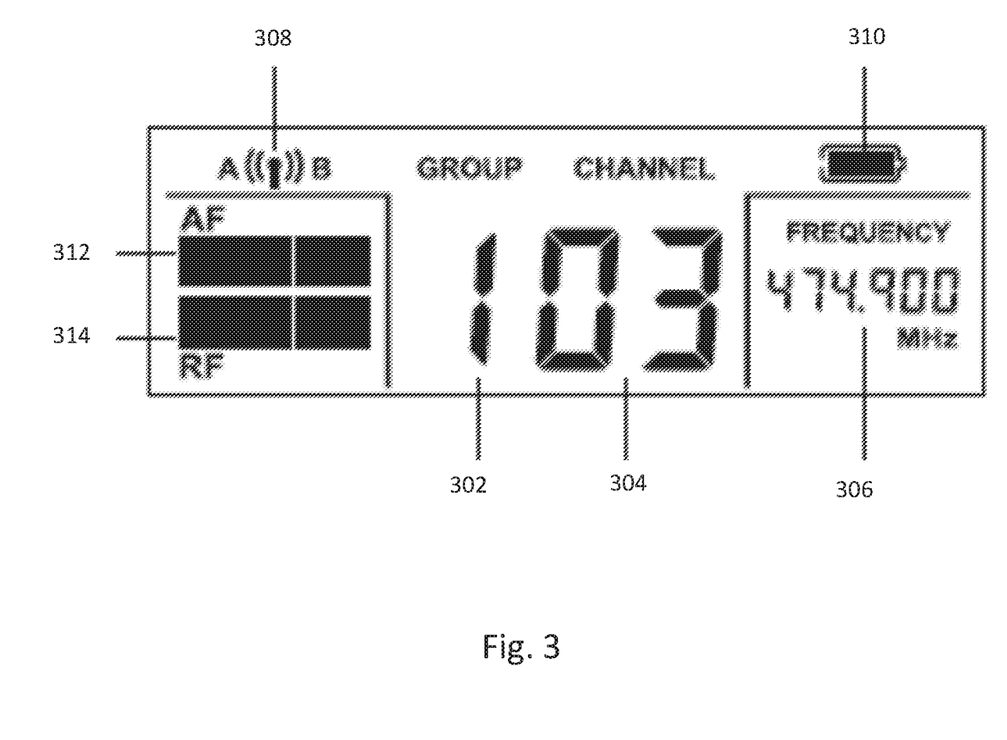
FIG. 3 depicts a schematic diagram sowing features of the display of the wireless receiver.

Display 206 generally comprises group indicator 302, channel indicator 304, frequency indicator 306, antenna indicator 308, battery level indicator 310, audio meter 312, and RF signal meter 314 as shown in FIG. 3. Group indicator 302 displayed the currently selected group. Channel indicator 306 displays the currently selected channel. Frequency indicator 306 displays the operating frequency of the currently selected group and channel. The below tables are example channel plans for the transmission frequency used at different group and channel combinations:

| Group K 470-494 MHz | | | | | | | | |
|---|---|---|---|---|---|---|---|---|
| | Channel | | | | | | | |
| Group | 00 | 01 | 02 | 03 | 04 | 05 | 06 | 07 |
| 0 | 473.050 | 474.425 | 474.900 | 480.475 | 484.075 | 486.975 | 487.975 | 492.425 |
| 1 | 470.125 | 471.500 | 471.975 | 477.550 | 481.150 | 484.050 | 485.050 | 489.500 |
| 2 | 470.525 | 471.900 | 472.375 | 477.950 | 481.550 | 484.450 | 485.450 | 489.900 |
| 3 | 471.075 | 472.450 | 472.925 | 478.500 | 482.100 | 485.000 | 486.000 | 490.450 |
| 4 | 471.475 | 472.850 | 473.325 | 478.900 | 482.500 | 485.400 | 486.400 | 490.850 |
| 5 | 472.025 | 473.400 | 473.875 | 479.450 | 483.050 | 485.950 | 486.950 | 491.400 |
| 6 | 472.425 | 473.800 | 474.275 | 479.850 | 483.450 | 486.350 | 487.350 | 491.800 |
| 7 | 473.375 | 474.750 | 475.225 | 480.800 | 484.400 | 487.300 | 488.300 | 492.750 |
| 8 | 473.925 | 475.300 | 475.775 | 481.350 | 484.950 | 487.850 | 488.850 | 493.300 |
| 9 | 474.325 | 475.700 | 476.175 | 481.750 | 485.350 | 488.250 | 489.250 | 493.700 |

| Group D** 542-586 MHz | | | | | | | | |
|---|---|---|---|---|---|---|---|---|
| | Channel | | | | | | | |
| Group | 00 | 01 | 02 | 03 | 04 | 05 | 06 | 07 |
| 0 | 545.050 | 546.425 | 546.900 | 552.475 | 556.075 | 558.975 | 559.975 | 564.425 |
| 1 | 542.125 | 543.500 | 543.975 | 549.550 | 553.150 | 556.050 | 557.050 | 561.500 |
| 2 | 542.525 | 543.900 | 544.375 | 549.950 | 553.550 | 556.450 | 557.450 | 561.900 |
| 3 | 543.075 | 544.450 | 544.925 | 550.500 | 554.100 | 557.000 | 558.000 | 562.450 |
| 4 | 543.475 | 544.850 | 545.325 | 550.900 | 554.500 | 557.400 | 558.400 | 562.850 |
| 5 | 544.025 | 545.400 | 545.875 | 551.450 | 555.050 | 557.950 | 558.950 | 563.400 |
| 6 | 544.425 | 545.800 | 546.275 | 551.850 | 555.450 | 558.350 | 559.350 | 563.800 |
| 7 | 545.375 | 546.750 | 547.225 | 552.800 | 556.400 | 559.300 | 560.300 | 564.750 |
| 8 | 545.925 | 547.300 | 547.775 | 553.350 | 556.950 | 559.850 | 560.850 | 565.300 |
| 9 | 546.325 | 547.700 | 548.175 | 553.750 | 557.350 | 560.250 | 561.250 | 565.700 |

| Group G* 863-865 MHz | | | | | | | | |
|---|---|---|---|---|---|---|---|---|
| | Channel | | | | | | | |
| Group | 00 | 01 | 02 | 03 | 04 | 05 | 06 | 07 |
| 0 | 863.050 | 863.550 | 863.750 | 864.050 | 864.250 | 864.550 | 864.750 | 864.950 |
| 1 | 863.100 | 863.600 | 863.800 | 864.100 | 864.300 | 864.600 | 864.800 | 863.300 |
| 2 | 863.150 | 863.650 | 863.850 | 864.150 | 864.350 | 864.650 | 864.850 | 863.350 |
| 3 | 863.200 | 863.700 | 863.900 | 864.200 | 864.400 | 864.700 | 864.900 | 863.400 |

It is important to note that certain transmission frequencies may be used in certain regions/areas but not others. For example, in the United States, certain transmission frequencies are restricted for military use. In the above tables, for example, Group G cannot be used in the US and Canada whereas Group D cannot be used in most European locations. Group K can generally be used in most locations worldwide. In some embodiments, wireless transmitted 102 is programmed with these tables which are accessed by a region selection unit which allows a user to set the region that the device is going to be used in.

Antenna indicator 308 indicates the currently active antenna. Battery level indicator 310 displays a battery level of the wireless microphone transceiver 102 currently operating on the selected group and channel. Audio meter 312 indicates the strength of the incoming audio signal and RF signal meter 314 indicates a strength of the incoming radio signal (i.e., the strength of wireless connection 106 between wireless microphone transceiver 102 and wireless receiver 104).

Figure 4:
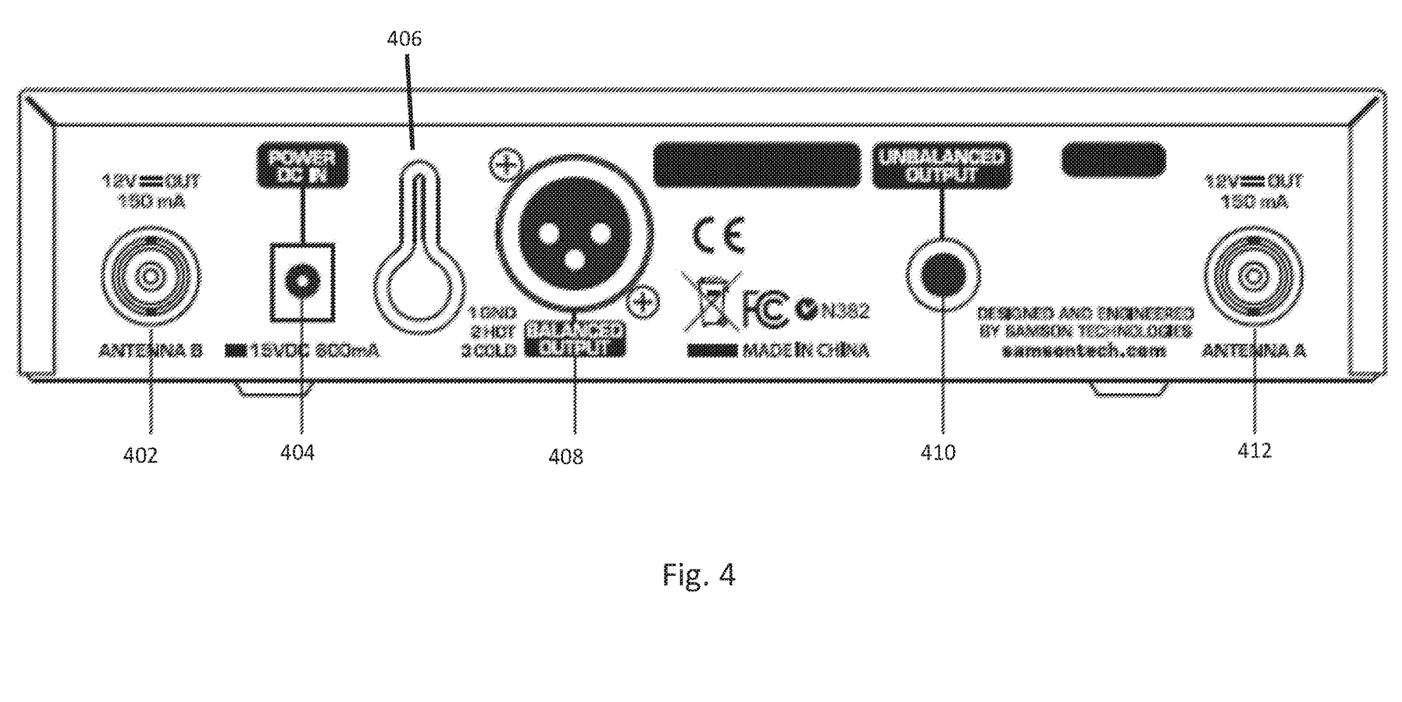
FIG. 4 depicts a schematic diagram showing features of a rear of the wireless receiver.

Turning next to FIG. 4, depicted is a rear view of wireless receiver 104 showing rear antenna jacks 402, power input 404, strain relief 406, balanced output jack 408, and unbalanced output jack 410. Like antenna jacks 202, rear antenna jacks are preferably BNC antenna jacks that allow for full rotation of any attached antenna. Power input 404 is preferably a DC 15V, 600 mA input jacket. The strain relief 406 can be used to prevent any undue strain on the power connection (e.g., strained wires or pins).

Balanced output jack 408 is an electronically balanced low impedance (600 Ohm) XLR jack for connecting wireless receiver 104 to professional (+4 dBu) audio equipment. Pin wiring for balanced output may be: Pin 1 ground, Pin 2 high (hot), and Pin 3 low (cold).

Unbalanced output jack 408 is an unbalanced high impedance (5 K Ohm) ¼" jack used to connect wireless receiver 104 to consumer (−10 dBV) audio equipment.

In a preferred embodiment, wireless receiver 104 has the following specifications:

| | |
|---|---|
| Audio Output Level - Unbalanced | +14 dBu |
| Audio Output Level - Balanced | +9 dBu |
| Audio Output Impedance - Unbalanced | 810 Ohms |
| Audio Output Impedance - Balanced | 240 Ohms |
| Sensitivity | −100 dBm/30 dB sinad |
| Image Rejection | >50 dB |
| Operating Voltage | 15 VDC 200 mA |
| Dimensions (L × W × H) | 7.87" × 5.9" × 1.6" (200 mm × 150 mm × 42 mm) |
| Weight | 2.08 lb/0.946 kg |

Wireless Microphone Transceiver 102

Wireless microphone transceiver 102 is a waterproof (IP 68 rated) transceiver capable of being clipped onto many surfaces such as a belt, shirt, waistband, or instrument bell.

As depicted in the various views of wireless microphone transceiver 102 shown in FIGS. 5-11, wireless microphone transceiver 102 comprises power/mute button 502, status indicator 504, volume buttons 506, IR lens 508, charging connector 510, input connector 512, and spring clip 514.

The power/mute button 502 uses a long press (e.g., 3 seconds) to turn the wireless microphone transceiver 102 on or off and a short press to mute or unmute when the wireless microphone transceiver 102 is on. The status indicator 504, which is preferably an LED ring surrounding the power/mute button 502, displays the operation mode, low battery indicator, and recharge status of the wireless microphone transceiver 102. For example, green may indicate normal operation, amber may indicate mute, flashing red may indicate low battery or charging, and red may indicate fully charged.

The volume buttons 506 are used to adjust the volume in steps with each push or hold of the button. The status indicator 504 preferably flashes faster for each increased volume step and lower for each decrease.

IR lens 508 is used to capture the infrared signal sent from IR transmitter 214 during pairing to set a channel for the wireless microphone transceiver 102. Preferably, the IR lens 508 is only active for a predetermined time period (e.g., 10 seconds) after the wireless microphone transceiver 102 is turned on.

Charging connector 510 is preferably a sealed, gold contact charging connector which mates with a magnetic charging cable as will be described later. The magnetic charging cable can be connected to a USB port or any 5-volt DC adapter that has a USB port.

Input connector 512 is used to connect an input device, such as a gooseneck microphone, to the wireless microphone transceiver 102 via the mini-XLR connector. Examples of microphones include a lavalier, headset or instrument microphone.

The spring clip 514 of the present invention, along with the shape/contour of the body of wireless microphone transceiver 102, allows the wireless microphone transceiver 102 to be securely clipped just as easily as to a waistband or an instrument bell, such as that of a saxophone or trombone.

Figure 8:
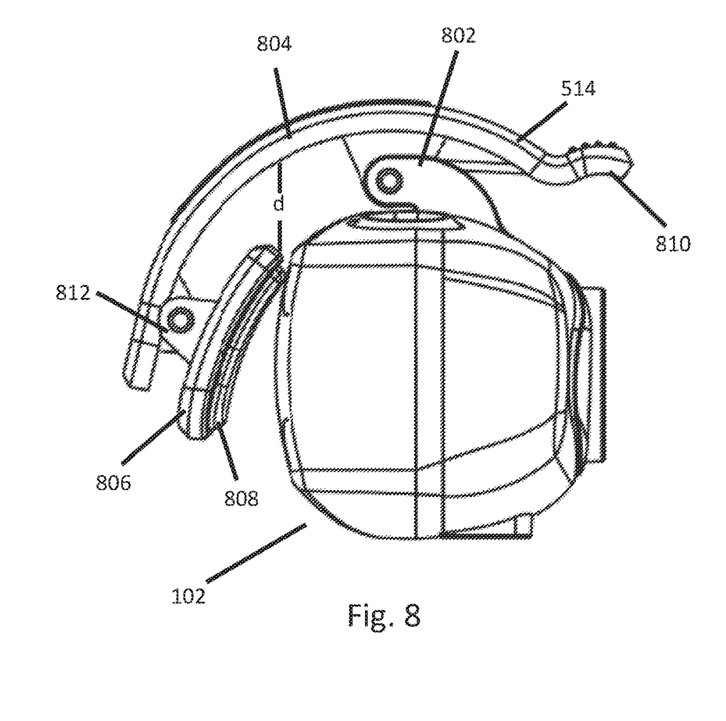
FIG. 8 depicts a left side view of the wireless microphone transceiver.
Figure 9:
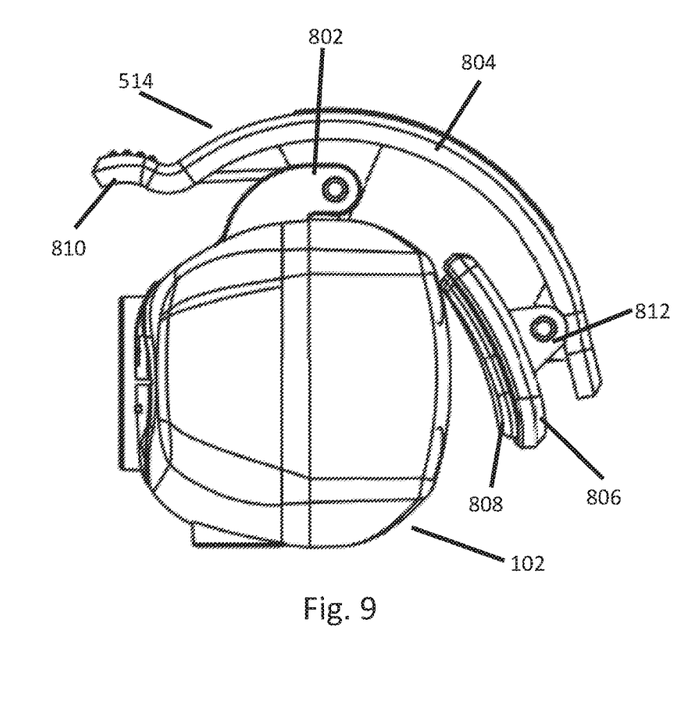
FIG. 9 depicts a right side view of the wireless microphone transceiver.

As shown in FIGS. 8 and 9, spring clip 514 is coupled to the top of wireless microphone transceiver 102 via pivot joint 802, allowing spring clip 514 to move between the open depicted position and a closed position in which pivot plate 806 is pressed against a rear of wireless microphone transceiver 102 by a spring in pivot joint 802 (not shown). Spring clip arm 804 is curved and spaced a distance d above a top pivot plate 806 to allow the spring clip to be inserted a secure distance onto an instrument bell as will be shown later.

A face of pivot plate 806, which contacts the rear of the wireless microphone transceiver 102 in the closed position, is preferably covered with pad 808. Pad 808 is preferably formed from a compressible foam or rubber which (a) prevents transmission of vibration to microphone transceiver 102 during use and (b) provides a friction surface to prevent movement of wireless microphone transceiver 102 during use. In some embodiments, pad 808 may further comprise a patterned surface (e.g., waffle pattern), to prevent slipping. And, as will be shown later, pad 808 is also preferably convex to mate with the concave rear surface 814 of wireless microphone transceiver 102.

Spring clip 514 further comprises textured surface 810 at one end of spring clip arm 804. The textured surface 810, which also preferably has a different curvature than the remainder of spring clip arm 804, allows a user to easily actuate spring clip 514 for placement with one hand.

Pivot plate 806 is preferably coupled to a second end of spring clip arm 804 via second pivot joint 812. Second pivot joint 812 may be free moving or biased to a central position by a spring, for example. Second pivot joint 812 allows for the pivot plate 806 to freely pivot (e.g., in one or two dimensions) to allow pad 808 to reliably and fully engage any surface (i.e., increase the contact surface area of pad 808). It should be obvious to one of ordinary skill in the art that the more surface area of pad 808 that comes into contact with an instrument for example, the more reliable the connection will be between wireless microphone transceiver 102 and the instrument.

Figure 5:
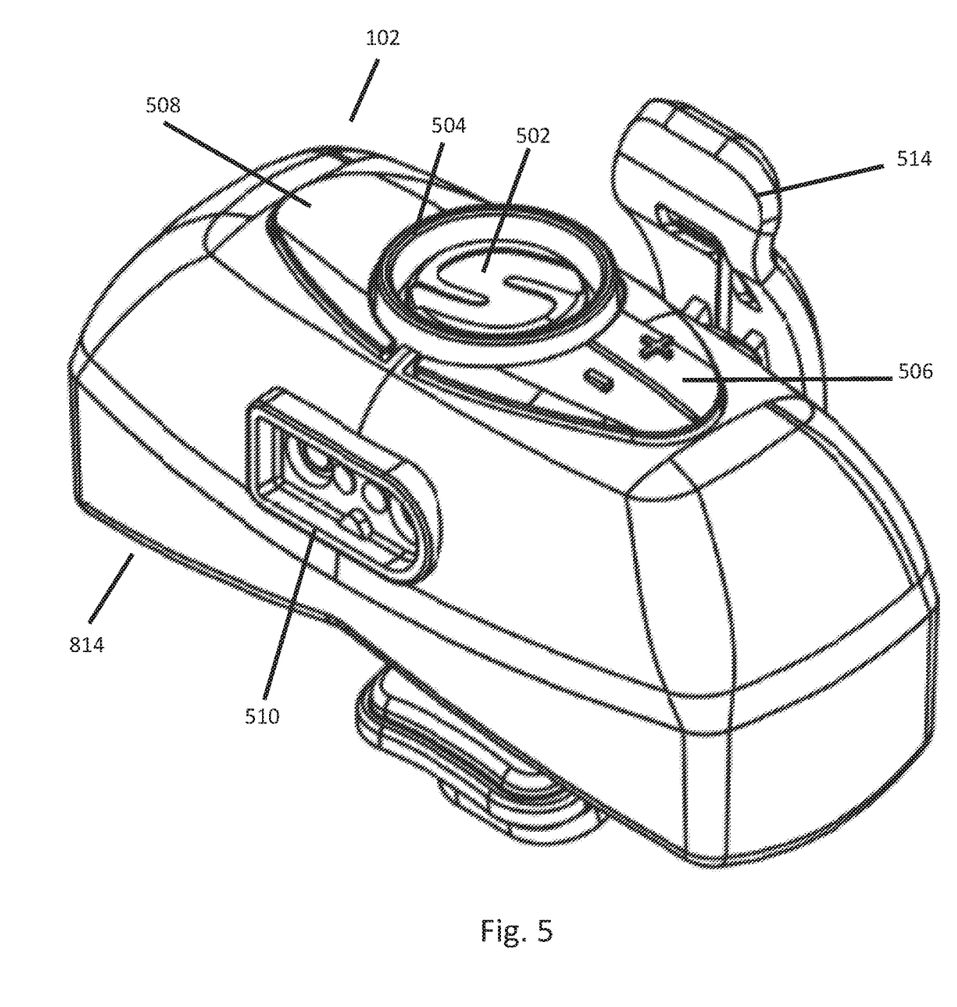
FIG. 5 depicts a bottom perspective view of the wireless microphone transceiver.
Figure 6:
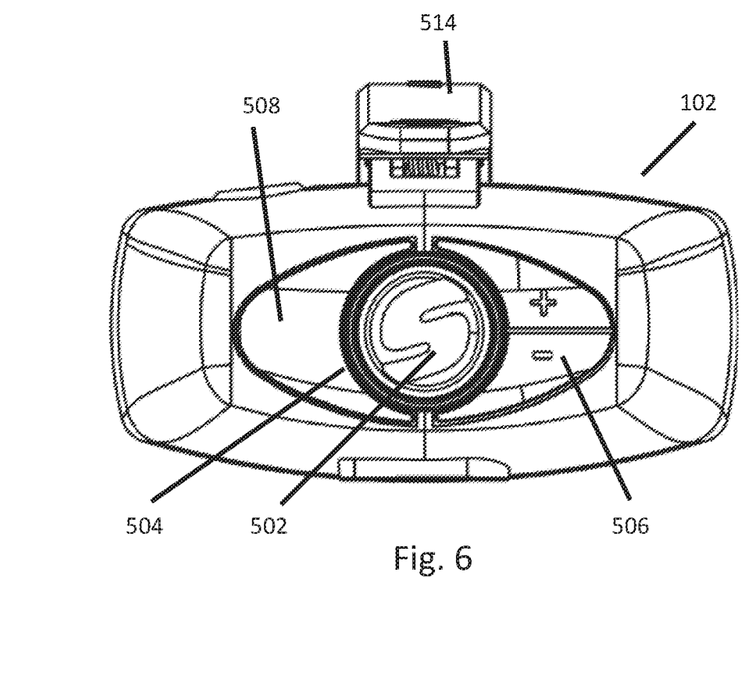
FIG. 6 depicts a front view of the wireless microphone transceiver.
Figure 7:
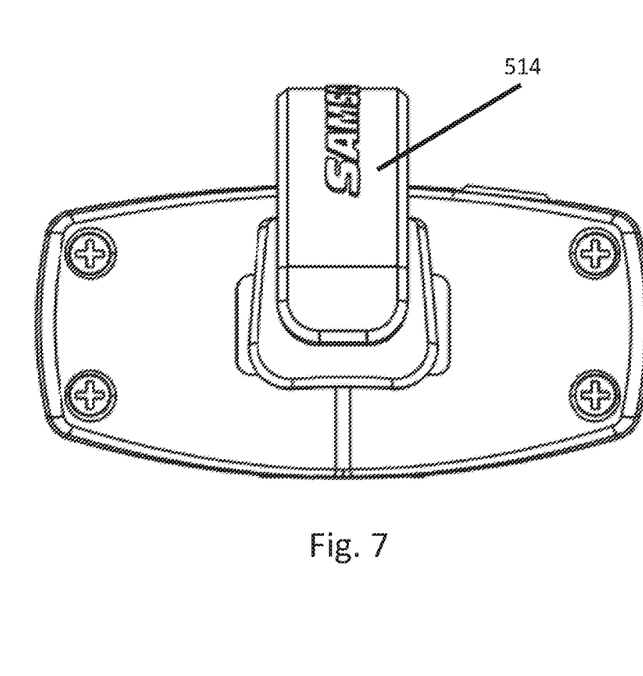
FIG. 7 depicts a rear view of the wireless microphone transceiver.
Figure 10:
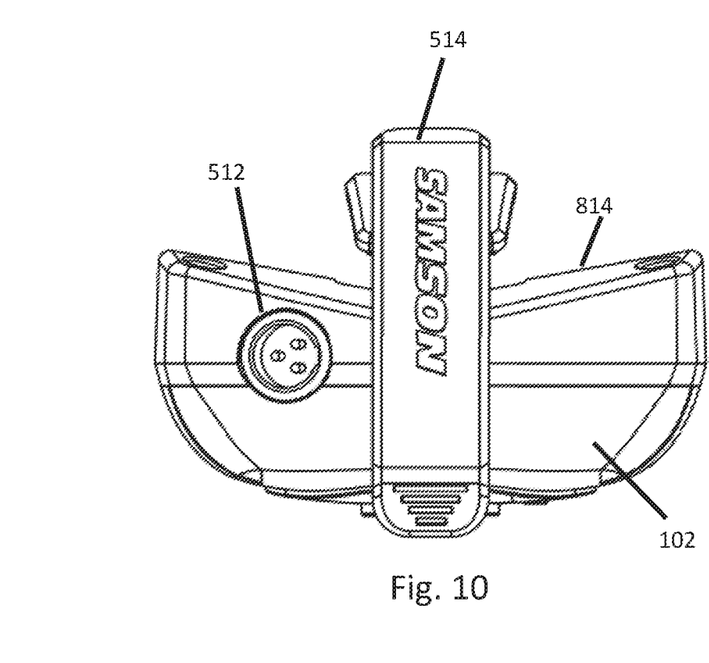
FIG. 10 depicts a top view of the wireless microphone transceiver.
Figure 11:
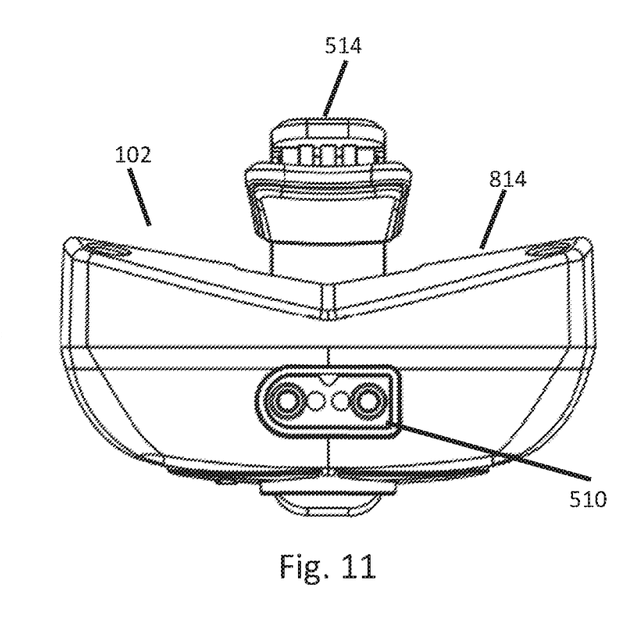
FIG. 11 depicts a bottom view of the wireless microphone transceiver.

As best depicted in FIGS. 5, 10, and 11, a rear surface 814 of wireless microphone transceiver 102 is preferably concave. Also, as shown in these views, a width of pad 808 is less than that of rear surface 814, allowing for easier connection of wireless microphone transceiver 102 to any surface, especially an instrument. In the depicted embodiment, the rear surface 814 can be formed by two intersecting planes angled toward each other or a completely curved surface (e.g., an arc). The rear surface 814 may also be covered with a textured or compressible surface similar to pad 808.

In a preferred embodiment, wireless microphone transceiver 102 has the following specifications:

| | |
|---|---|
| Input Connector | Mini-XLR (P3) |
| Input Impedance | 3 kΩ |
| Input Gain Range | 20 dB |
| RF Power | 10 mW EIRP |
| Power Requirements | 3.6 V 500 mAh |
| Lithium Ion rechargeable battery | Magnetic connector |
| Battery Life | 8 hours |
| Dimensions (L × W × H) | 5.9" × 6.7" × 3.9" |
| | (150 mm × 170 mm × 100 mm) |
| Weight 0.13 lb/60 g | |

Wireless Transmission System 100 Setup and Configuration

Figure 12:
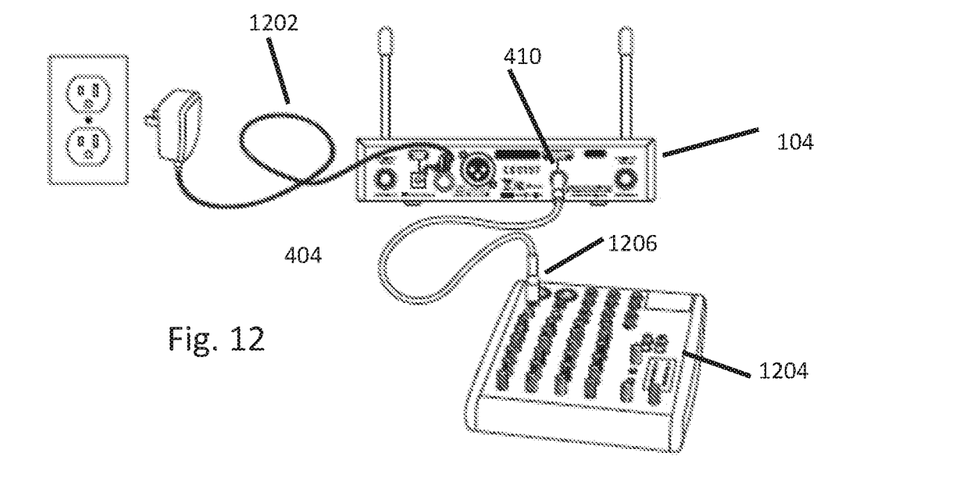
FIGS. 12-17 depicts the steps utilized to synchronize the wireless microphone transceiver with the wireless receiver.

In order for the wireless transmission system 100 to work properly, both the wireless microphone transmitter 102 and the wireless receiver 104 must be set to the same channel. To do this, the wireless receiver 104 is first placed where it will be used during transmission and the antennas are extended vertically as shown in FIG. 12. Maintaining "line of sight" between the wireless microphone transmitter 102 and the wireless receiver 104 assists with transmission.

When the wireless receiver 104 is powered off, the power adapter 1202 is connected to the power input 404. The wireless receiver 104 can then be turned on momentarily using power button 212 to confirm that wireless receiver 104 is receiving power.

With the power on amplifier or mixer 1204 off and volume control all the way down, the unbalanced output jack 410 (or balanced output jack 408) can be connected to the microphone or line level input 1206. Before turning the wireless received 104 on, the volume control 204 should be set to its lowest setting.

Figure 13:
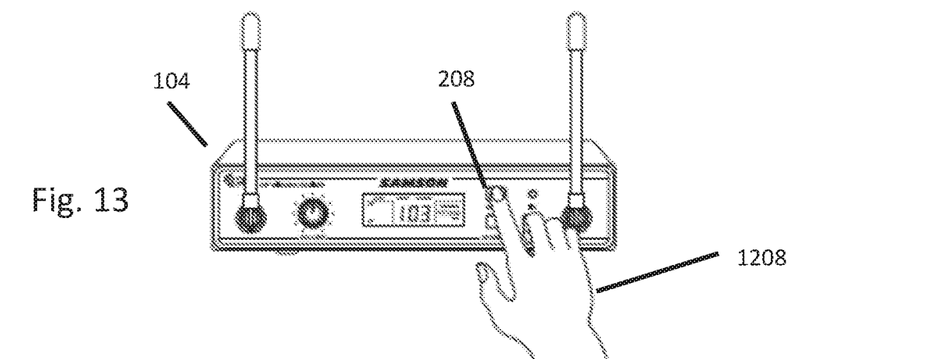
Figure 14:
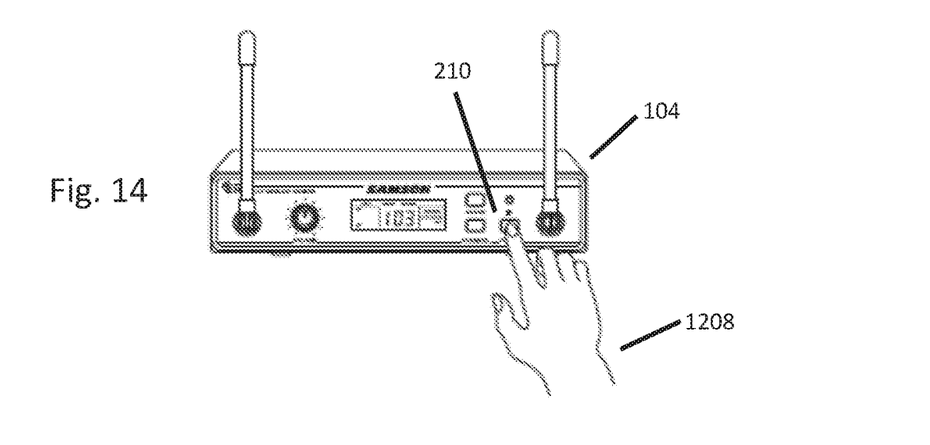
Figure 15:
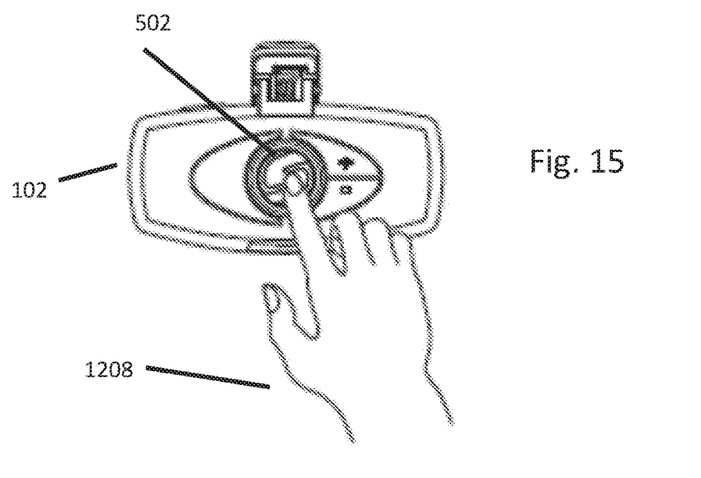

After the wireless receiver 104 is turned on, the user 1208 holds the group button 208 as shown in FIG. 13 to scan for an available channel with the selected group. The user then presses and holds the channel button 210 as shown in FIG. 14 to execute an IR Set which synchronizes the wireless microphone transceiver 102 with the wireless transmitter 104 via infrared transmission.

At this point, the user 1208 places the wireless microphone transceiver 102 about 15-30 cm from the front (FIG. 2) of the wireless receiver 104 with the IR lens 508 facing the IR transmitter 214. The user 1208 then presses the power/mute button 502 to turn the wireless microphone transceiver on. The status indicator 504 will light yellow when the power/mute button 502 is pressed and turns green when released and the wireless microphone transceiver 104 is powered on.

Figure 16:
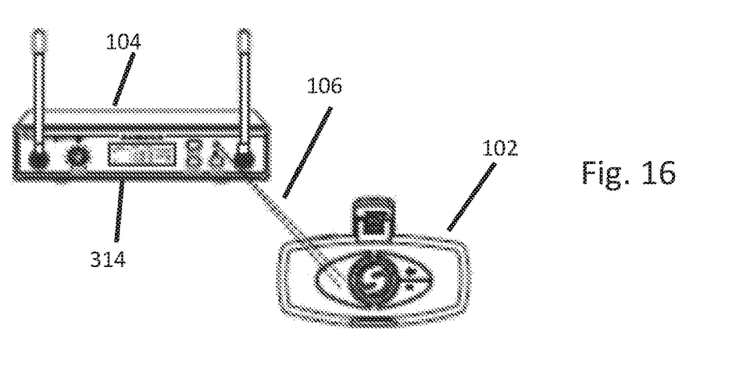

When the IR Set is complete, the wireless microphone transceiver 104 will transmit an RF signal with a tone key to the wireless received as shown in FIG. 16. This causes the RF signal meter 314 to indicate that wireless receiver 104 is receiving the RF signal from the wireless microphone transceiver 102 via wireless connection 106.

Figure 17:
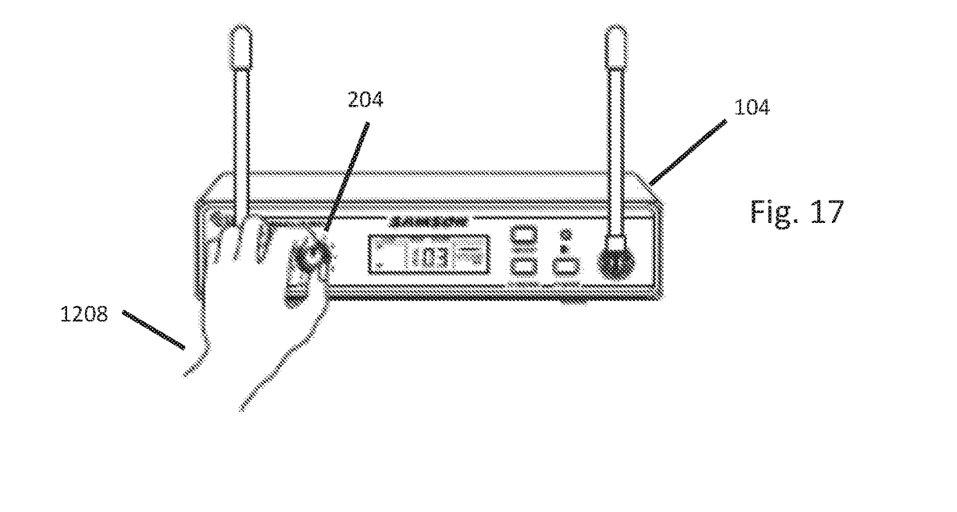

The amplifier or mixer 1204 is then turned on with the volume all the way down. The volume control 204 is then set to the highest setting to perform unity gain as depicted in FIG. 17. A microphone is then plugged into wireless microphone transmitter 102 and user 1208 speaks, sings, or plays the instrument into the microphone at a normal performance level. The volume of the amplifier or mixer 1204 can then be slowly raised until the desired volume level is reached.

Preferably, the user 1208 also walks around the performance space to ensure that there are no dropouts, reduced working range locations, or noise bursts. If so, the channel assigned to wireless microphone transceiver 102 may need to be adjusted. If multiple wireless transmitter systems 100 are to be utilized, each wireless transmitter system 100 should use a different group.

Rack Mounting the Wireless Receiver 104

Figure 18:
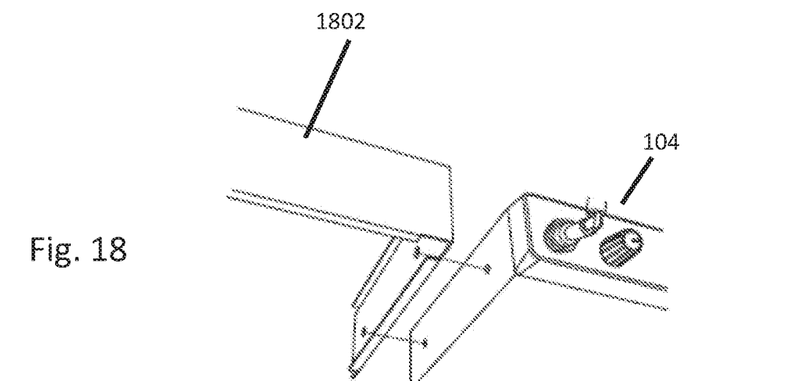
FIGS. 18-21 depict the steps utilized to mount the wireless receiver in a rack.
Figures 19, 20:
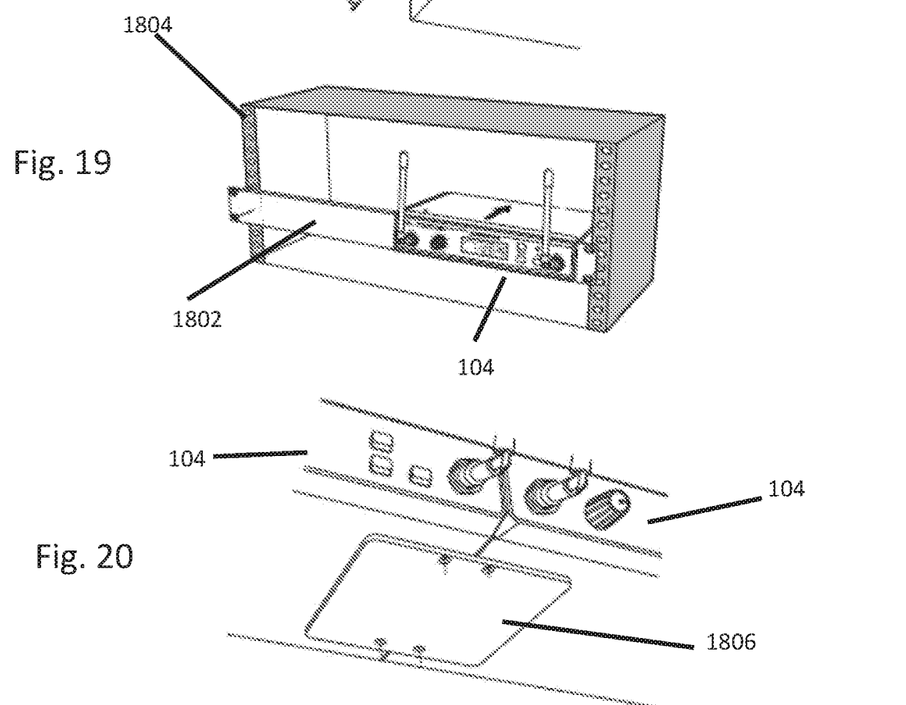
Figure 21:
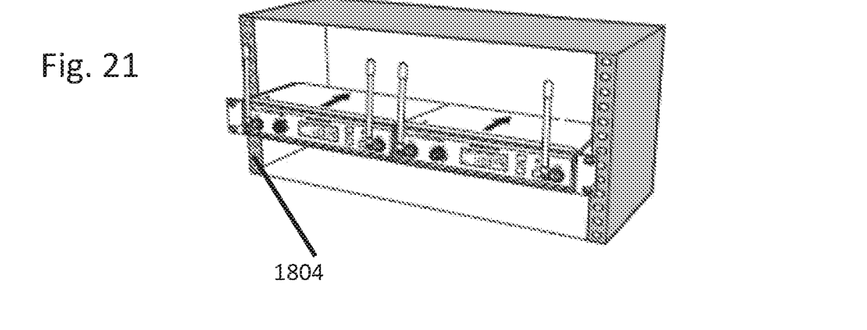

The wireless receiver can be installed into a standard 19" rack for transport or permanent installation by using rack ears 1802. First, each rack ear 1802 is screwed into the sides of wireless receiver 104 as shown in FIG. 18. The ends of rack ears 1802 can then be attached to rails 1804 of the rack as shown in FIG. 19. Two wireless receivers 104 can also be mounted side by side by attaching a connection plate 1806 to the bottom of each wireless receiver 104 as shown in FIG. 20 and securing rack ears 1802 to the ends of the combined wireless receivers 104 as shown in FIG. 21.

Placement of Wireless Microphone Transceiver 102

Figure 22:
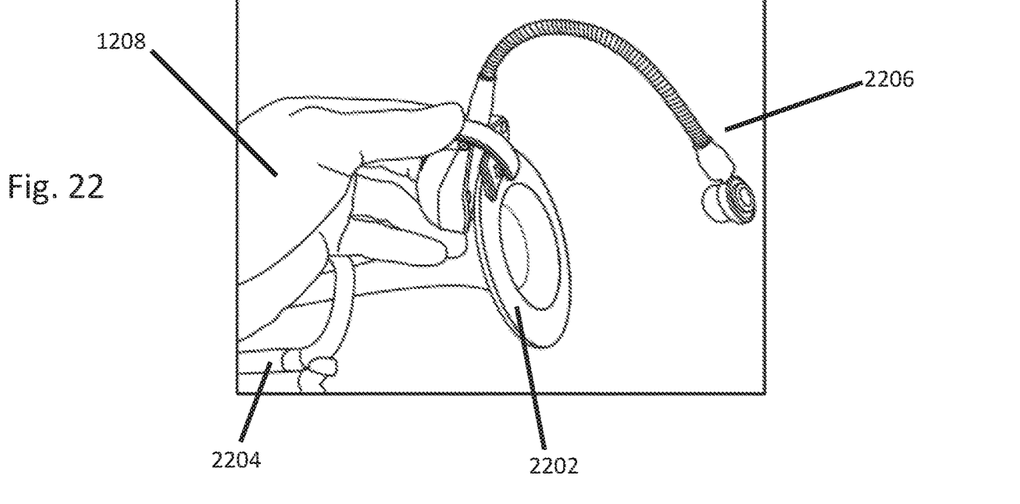
FIGS. 22-25 depict the steps utilized to attach the wireless microphone transceiver to various surfaces.
Figure 23:
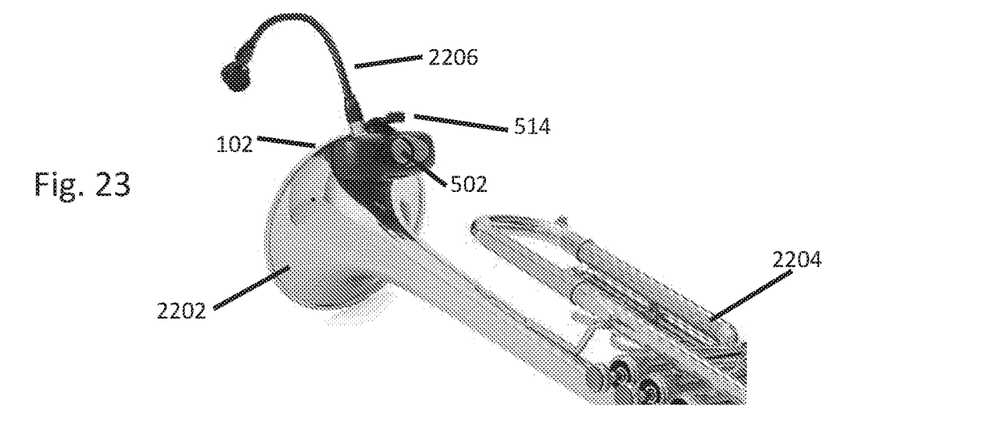
Figure 24:
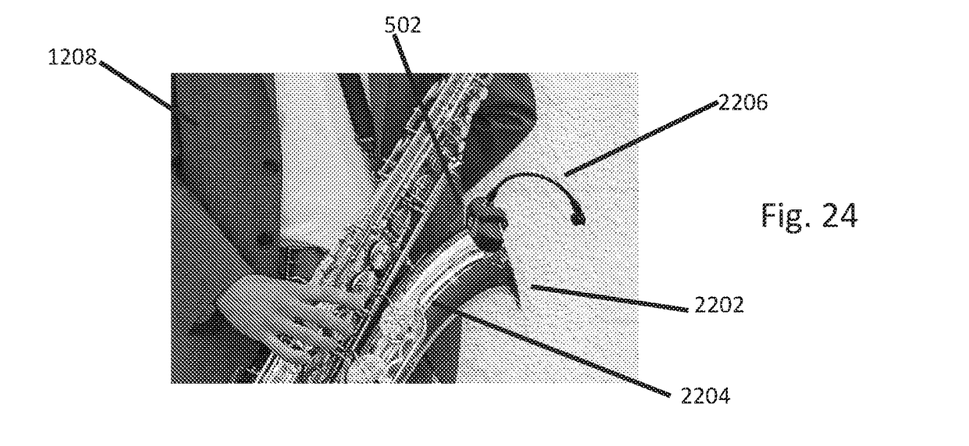

FIGS. 22-24 depict the steps used for placement of wireless microphone transceiver 102 onto a bell 2202 of an instrument 2204. As is known in the art, many instruments, especially brass instruments, have a bell 2202 which take on many different forms but generally have a similar shape. To attach wireless microphone transceiver 102 to bell 2202, the user 1208 presses textured surface 810 to open spring clip 514 as shown in FIG. 22. The user 1208 then positions the open spring clip 514 over bell 2202 such that pad 808 contacts a first side of bell 2202 and rear surface 814 contacts a second side of bell 2202. As previously described, the clearance d provided by spring clip arm 804 allows the wireless microphone transceiver 102 to be reliably placed below the lip of the bell 2202. Thus, the lip of bell 2202 provides further securement of wireless microphone transceiver 102 to instrument 2204.

Once the user is satisfied with the placement of wireless microphone transceiver 102, the user 1208 can adjust microphone 2206 (e.g., a gooseneck microphone) using one or both hands as shown in FIG. 23. The pad 808 provides a reliable connection on the first side of bell 2202 while the rear surface 814 provides a large surface area to contact bell 2202. And, as previously noted, the curvature/convexity/concavity of pad 808 and rear surface 814 helps provide a more reliable connection of wireless microphone transceiver 102 to curved surfaces, such as bells 2202.

FIG. 23 depicts instrument 2204 as a trumpet whereas FIG. 24 depicts instrument 2204 as a saxophone. By having the spring clip positioned along a top of wireless microphone transceiver 102 and power/mute button 502 located on a front surface of wireless microphone transceiver 102, the user 1208 is provided with one handed access to the mute function of wireless microphone transceiver 102 on most brass instruments in contrast to prior art wireless microphone transceivers. Further, by making power/mute button 502 larger than a fingertip size of a general user's hand, there is little chance that the user 1208 may inadvertently press the other face buttons such as volume buttons 506. There is also little chance that the user 1208 will inadvertently turn the wireless microphone transceiver 102 on or off because powering it requires a long press while muting and unmuting requires a short press. Further, user 1208 can easily move the same wireless microphone transceiver 102 between multiple instruments 2204 which may be required in a recording or studio session.

Figure 25:
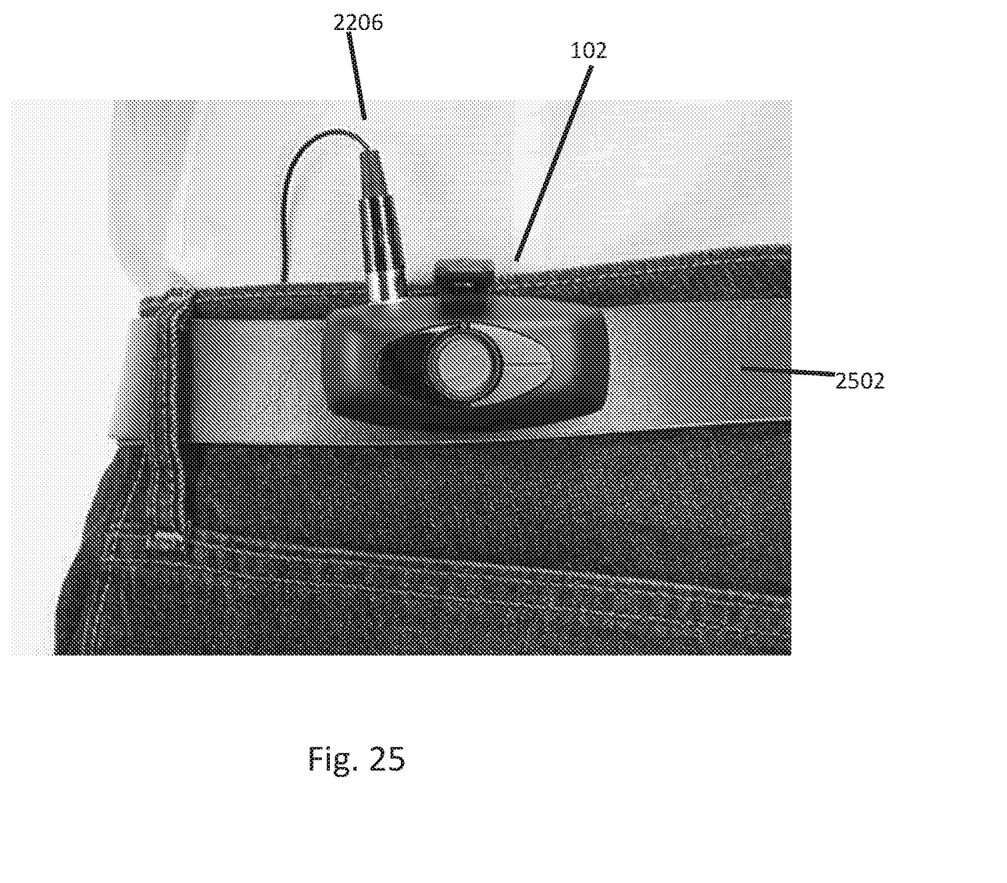

FIG. 25 further depicts the versatility of wireless microphone transceiver 102 in which it is attached to belt or waistband 2502 via spring clip 514. In this example, it is important to also note that the user 1208 still has easy one handed access to power/mute button 502, can easily remove wireless microphone transceiver 102 with one hand. Further, by having input connector 512 located on the top surface of wireless microphone transceiver 102 adjacent to pivot joint 802, the user can also easily connect/disconnect microphone 2206.

In FIG. 25, the microphone 2206 would typically be positioned next to the mouth of the user 1208. However, FIG. 25 also demonstrates how wireless microphone transmitter 102 may also be utilized with other instruments 2204 that may require a specific microphone type or connector, such as woodwinds and/or drums. Because input connector 512 is preferably an industry standard jack, any microphone 2206 type can be connected to it via a lead, such as is depicted in FIG. 25.

The invention claimed is:

1. A wireless transceiver comprising:
a body, wherein a rear surface of the body has at least one concave surface;
a pivot joint coupled to a top surface of the body; a spring clip coupled to the pivot joint;
wherein the spring clip comprises:
 a curved arm;
 a second pivot joint coupled to the curved arm in a vicinity of a first end of the curved arm; and
 a pivot plate coupled to the second pivot joint, wherein a front surface of the pivot plate comprises a convex surface that mates with at least a portion of the at least one concave surface when the pivot joint is in a closed position,
wherein the second pivot joint is pivotable in two-dimensions.

2. The wireless transceiver of claim 1, further comprising: a circular power button centered on a center of a front of the body, wherein a long touch of the circular power button turns the wireless transceiver on or off, and wherein a short touch of the circular power button mutes or unmutes the wireless transceiver.

3. The wireless transceiver of claim 2, further comprising: a pair of volume buttons abutting a first side of the circular power button.

4. The wireless transceiver of claim 3, further comprising: an IR port abutting a second side of the circular power button opposite the first side.

5. The wireless transceiver of claim 2, wherein the circular power button is surrounded by a circular LED indicator, wherein the circular LED indicator indicates a current status of the wireless transceiver.

6. The wireless transceiver of claim 1, wherein at least a portion of the curved arm extends a distance d above a top surface of the pivot plate.

7. The wireless transceiver of claim 1, wherein a second end of the curved arm terminates in a pressing surface of opposite curvature to the curved arm, wherein a top surface of the pressing surface is textured.

8. The wireless transceiver of claim 1, wherein the pivot plate further comprises: a compressible pad covering the front surface of the pivot plate.

9. The wireless transceiver of claim 8, wherein the at least one concave surface is covered with a compressible pad.

10. The wireless transceiver of claim 8, wherein the compressible pad is formed from a compressible rubber material or a compressible foam material.

11. The wireless transceiver of claim 8, wherein a front surface of the compressible material comprises a textured surface.

12. The wireless transceiver of claim 1, wherein a bottom surface of the first end of the curved arm is approximately parallel to the top surface of the body and approximately perpendicular to the at least one concave surface, and wherein a bottom surface of a second end of the curved arm is approximately perpendicular to the top surface of the body and approximately parallel to the at least one concave surface.

13. The wireless transceiver of claim 1, wherein a bottom surface of the first end of the curved arm is approximately parallel to the top surface of the body and approximately perpendicular to the rear surface of the body, and wherein a bottom surface of a second end of the curved arm is approximately perpendicular to the top surface of the body and approximately parallel to the rear surface of the body.

\* \* \* \* \*